United States Patent
Futakuchi et al.

(10) Patent No.: US 11,370,182 B2
(45) Date of Patent: Jun. 28, 2022

(54) AUTOMATIC LAMINATING APPARATUS HAVING WELDING DEVICE

(71) Applicant: TSUDAKOMA KOGYO KABUSHIKI KAISHA, Ishikawa-ken (JP)

(72) Inventors: Mitsunobu Futakuchi, Ishikawa-ken (JP); Keisuke Sakuma, Ishikawa-ken (JP); Isao Nishimura, Ishikawa-ken (JP)

(73) Assignee: TSUDAKOMA KOGYO KABUSHIKI KAISHA, Ishikawa-ken (JP)

( * ) Notice: Subject to any disclaimer, the term of this patent is extended or adjusted under 35 U.S.C. 154(b) by 0 days.

(21) Appl. No.: 16/909,089

(22) Filed: Jun. 23, 2020

(65) Prior Publication Data
US 2021/0016522 A1 Jan. 21, 2021

(30) Foreign Application Priority Data
Jul. 17, 2019 (JP) .............................. JP2019-131957

(51) Int. Cl.
 *B29C 70/38* (2006.01)
 *B29K 101/12* (2006.01)
 *B29K 307/04* (2006.01)

(52) U.S. Cl.
 CPC ........ *B29C 70/388* (2013.01); *B29K 2101/12* (2013.01); *B29K 2307/04* (2013.01)

(58) Field of Classification Search
 CPC ..... B29C 70/38; B29C 70/382; B29C 70/384; B29C 70/386; B29C 70/388; B29K 2101/12; B29K 2307/04
 See application file for complete search history.

(56) References Cited

U.S. PATENT DOCUMENTS

| 5,418,035 A | 5/1995 | Iguchi et al. |
| 5,464,493 A | 11/1995 | Iguchi et al. |

(Continued)

FOREIGN PATENT DOCUMENTS

| AT | 519766 B1 | 10/2018 |
| EP | 3243641 A1 | 11/2017 |

(Continued)

OTHER PUBLICATIONS

Google Patents translation of WO-2019046875-A1, Mar. 2019, Danninger Norbert (Year: 2019).*

(Continued)

*Primary Examiner* — George R Koch
(74) *Attorney, Agent, or Firm* — Paratus Law Group, PLLC

(57) ABSTRACT

An automatic laminating apparatus includes: a lay-up head provided with a raw-cloth roller on which a thermoplastic prepreg is wound and a pressing device for pressing the thermoplastic prepreg drawn from the raw-cloth roller against a lamination surface; and a welding device provided with a welding head pressed against the thermoplastic prepreg to temporarily weld the thermoplastic prepreg to the lamination surface, the automatic laminating apparatus laminating the thermoplastic prepreg by performing a lamination operation of moving the lay-up head to lay the thermoplastic prepreg having a predetermined length on the lamination surface, in which the welding device is provided in the lay-up head, and the automatic laminating apparatus further comprises a drive control device that causes the welding device to perform temporary welding of the thermoplastic prepreg laid in the lamination operation in a course of the lamination operation.

1 Claim, 4 Drawing Sheets

(56) References Cited

U.S. PATENT DOCUMENTS

| | | | | |
|---|---|---|---|---|
| 2013/0149491 A1* | 6/2013 | Wakeman | ........... | B29C 66/7212 |
| | | | | 428/114 |
| 2013/0263999 A1* | 10/2013 | Weiland | ................ | B29C 66/721 |
| | | | | 156/73.1 |
| 2020/0215767 A1* | 7/2020 | Danninger | ............ | B29C 70/388 |

FOREIGN PATENT DOCUMENTS

| | | |
|---|---|---|
| JP | H05-185539 A | 7/1993 |
| WO | WO-2019046875 A1 * | 3/2019 ............. B29C 70/38 |

OTHER PUBLICATIONS

Nov. 27, 2020, European Search Report issued for related EP Application No. 20181960.4.

* cited by examiner

AUTOMATIC LAMINATING APPARATUS HAVING WELDING DEVICE

CROSS-REFERENCE TO RELATED APPLICATIONS

The present application claims priority from Japanese Patent Application No. 2019-131957, filed Jul. 17, 2019, the entire content of which is incorporated herein by reference.

BACKGROUND OF THE INVENTION

Field of the Invention

The present invention relates to an automatic laminating apparatus including: a lay-up head provided with a raw-cloth roller on which a thermoplastic prepreg is wound and a pressing device for pressing the thermoplastic prepreg drawn from the raw-cloth roller against a lamination surface; and a welding device provided with a welding head pressed against the thermoplastic prepreg to temporarily weld the thermoplastic prepreg to the lamination surface, the automatic laminating apparatus laminating the thermoplastic prepreg by performing a lamination operation of moving the lay-up head to lay the thermoplastic prepreg having a predetermined length on the lamination surface.

Background Art

A fiber-reinforced composite material such as carbon-fiber-reinforced-plastic (CFRP) is manufactured from a prepreg laminate formed by laminating a prepreg formed by impregnating a reinforced fiber (carbon fiber or the like) with a matrix resin. That is, in manufacturing the fiber-reinforced composite material, first, the prepreg is laminated. Examples of the matrix resin of the prepreg include a thermosetting resin and a thermoplastic resin. However, it is known that the prepreg using the thermoplastic resin as the matrix resin has a better moldability as compared to that using the thermosetting resin.

An automatic laminating apparatus for laminating such prepregs is generally known. The automatic laminating apparatus includes a lay-up head including a raw-cloth roller on which a prepreg is wound and a pressing device for pressing a prepreg drawn from the raw-cloth roller against a lamination surface. The automatic laminating apparatus repeats a lamination operation of laying the prepreg on the lamination surface while drawing out the prepreg from the raw-cloth roller by moving the lay-up head on the lamination surface, thereby laminating a desired prepreg. One lamination operation is performed such that a prepreg having a predetermined length is laid (laminated) on the lamination surface.

In addition, since the thermoplastic resin has a surface viscosity at room temperature which is much lower than that of the thermosetting resin, when the prepreg laminated as described above is a thermoplastic prepreg formed by impregnation with such a thermoplastic resin, the thermoplastic prepreg is not adhered to the lamination surface only by the laying as described above. For example, as disclosed in JP-A-05-185539, when the laminated prepreg is a thermoplastic prepreg, in order to cause the laid thermoplastic prepreg to adhere to the lamination surface, after the lamination operation is performed, the thermoplastic prepreg is temporarily welded (temporarily fixed) to the lamination surface by the welding device. Therefore, the automatic laminating apparatus for a thermoplastic prepreg includes a welding device for the temporary welding. By the way, an ultrasonic welding device, an infrared welding device and the like are known as the welding device.

SUMMARY OF THE INVENTION

By the way, in a general automatic laminating apparatus for a thermoplastic prepreg according to the related art, a welding device thereof is installed at a position different from that of the lay-up head. In such an automatic laminating apparatus, after the lamination operation is performed, the lay-up head is retracted to be separated from the laid thermoplastic prepreg, and thereafter, the welding device moves to a position of the laid thermoplastic prepreg to perform the temporary welding.

Therefore, in such an automatic laminating apparatus, a time is consumed from completion of the laying of the thermoplastic prepreg by one lamination operation to start of the temporary welding of the thermoplastic prepreg, and due to vibration of the apparatus or the like, a positional deviation occurs in which a position of the laid thermoplastic prepreg may deviate from a position where the thermoplastic prepreg is to be laminated. When the thermoplastic prepreg is temporarily welded in a state in which such a positional deviation occurs, the manufactured fiber-reinforced composite material does not satisfy a desired quality, thereby resulting in poor quality.

An object of the present invention is to provide an automatic laminating apparatus that can prevent poor quality of a fiber-reinforced composite material manufactured by performing temporary welding of the laminated thermoplastic prepreg on a lamination surface without causing the positional deviation of the laid thermoplastic prepreg.

The present invention is based on an automatic laminating apparatus including: a lay-up head provided with a raw-cloth roller on which a thermoplastic prepreg is wound and a pressing device for pressing the thermoplastic prepreg drawn from the raw-cloth roller against a lamination surface; and a welding device provided with a welding head pressed against the thermoplastic prepreg to temporarily weld the thermoplastic prepreg to the lamination surface, the automatic laminating apparatus laminating the thermoplastic prepreg by performing a lamination operation of moving the lay-up head to lay the thermoplastic prepreg having a predetermined length on the lamination surface. In addition, in order to achieve the above object, the present invention is based on the automatic laminating apparatus in which the welding device is provided in the lay-up head, and the automatic laminating apparatus further includes a drive control device that causes the welding device to perform temporary welding of the thermoplastic prepreg laid in the lamination operation in a course of the lamination operation.

Further, in the automatic laminating apparatus according the present invention, the welding device may include a pressing mechanism as the pressing device, and the pressing mechanism may include a pressing plate that presses the thermoplastic prepreg on both sides of the welding head in a width direction of the laid thermoplastic prepreg.

Further, the automatic laminating apparatus according to the present invention may include a drive device including a support member to which the pressing plate and the welding head are attached, the support member being supported by the lay-up head to be vertically movable, and a drive mechanism that drives the support member in a vertical direction.

According to the automatic laminating apparatus of the present invention, without waiting for completion of the laying of the thermoplastic prepreg by the one lamination operation, in a course of the lamination operation, while laying the thermoplastic prepreg, the laid thermoplastic prepreg can be temporarily welded to the lamination surface. Accordingly, a large time interval does not occur between a time when the thermoplastic prepreg is laid and a time when the temporary welding is started as in the apparatus according to the related art, and the above-described positional deviation does not occur, so that poor quality of the manufactured fiber-reinforced composite material can be prevented.

Further, in the automatic laminating apparatus according to the present invention, the pressing plate is configured such that the thermoplastic prepreg is pressed against the lamination surface on both sides of the welding head, so that a movement speed of the lay-up head in the lamination operation can be increased, and one lamination operation can be performed in a shorter time. Details are as follows.

The welding device presses the welding head against the thermoplastic prepreg, to generate heat in a portion of the thermoplastic prepreg where the welding head is pressed, so as to dissolve a matrix resin in that portion, thereby welding the thermoplastic prepreg to the lamination surface side. Here, considering a case where a thermoplastic prepreg is further laminated on the thermoplastic prepreg that has already been laminated, as the welding head acts on the thermoplastic prepreg (lamination side) that is laminated by the lamination operation as described above, heat also acts on (is generated in) the corresponding portion of the thermoplastic prepreg on a side to be laminated, so that the matrix resin in this portion is also dissolved. The degree of dissolution of the matrix resin per unit time in the thermoplastic prepreg on the side to be laminated increases as the degree of adhesion between the thermoplastic prepreg on the lamination side and the thermoplastic prepreg on the side to be laminated increases. In other words, in order to obtain the same degree of dissolution, the higher the degree of adhesion, the shorter a time therefore.

Therefore, by adopting a pressing device having a pressing plate that presses the thermoplastic prepreg on the lamination side on both sides of the welding head, a pressing force acts on the thermoplastic prepreg at the same position as a position where the welding head acts in the drawing direction of the thermoplastic prepreg, and thus the degree of adhesion of the thermoplastic prepreg to the lamination surface side at the position where the welding head acts can be increased. Accordingly, since a time required for dissolving the matrix resin in the thermoplastic prepreg to a desired degree can be shortened, the movement speed of the welding device (the lay-up head) can be further increased. By increasing the movement speed of the lay-up head, a time required for one lamination operation can be further reduced.

Further, in the automatic laminating apparatus according to the present invention, the pressing plate and the welding head are attached to the common support member, and the support member is driven vertically by the drive mechanism, so that it is possible to avoid an increase in the size of the lay-up head including the pressing plate and the welding head.

DETAILED DESCRIPTION OF THE INVENTION

Figure 1:
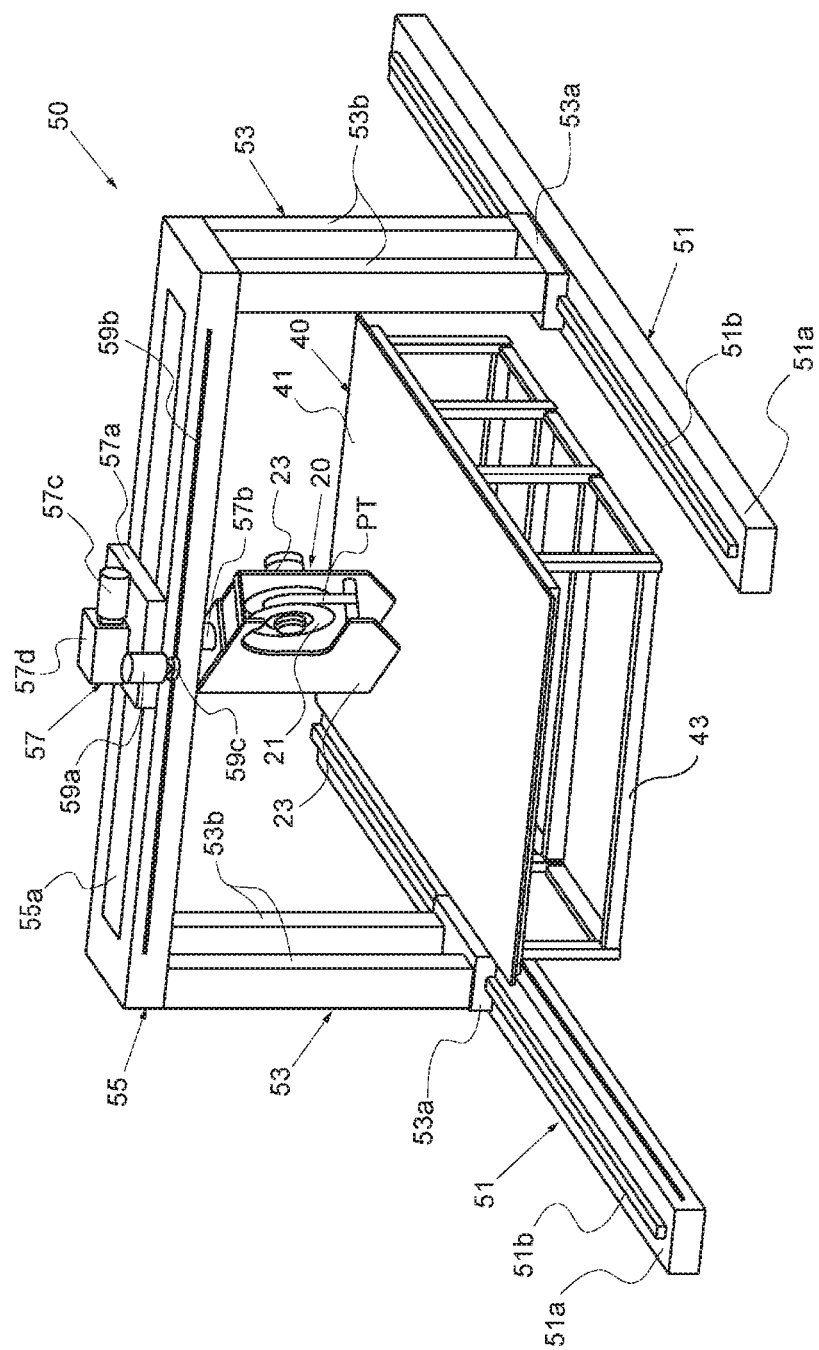
FIG. 1 is a perspective view showing an automatic laminating apparatus to which the present invention is applied.

As shown in FIG. 1, an automatic laminating apparatus to which the present invention is applied includes: a lay-up head 20 equipped with a raw-cloth roller 21 on which a long tape-shaped thermoplastic prepreg is wound; a table 40 on which the thermoplastic prepreg drawn out from the lay-up head 20 is laminated (laid); and a gate-type support mechanism 50 that supports (suspends) the lay-up head 20 in a suspended manner and moves the lay-up head 20 onto the table 40 in order to laminate (lay) the thermoplastic prepreg on the upper surface of the table 40.

For each of these components, the table 40 includes a top plate 41 having a rectangular shape in plan view and a support base 43 that supports the top plate 41. Further, the support mechanism 50, which has a gate-shaped structure as described above, includes: a gantry portion including a pair of side rails 51 and 51, a pair of columns 53 and 53 provided corresponding to the respective side rails 51, and a crossbeam 55 erected between the columns 53 and 53; and a saddle portion 57 provided on the crossbeam 55 in the gantry portion to support the lay-up head 20.

In the support mechanism 50, the pair of side rails 51 and 51 in the gantry portion are portions serving as bases of the support mechanism 50, and are portions mainly configured with long prismatic base portions 51a. The pair of side rails 51 and 51 are installed on a floor surface on both sides of the top plate 41 in the short side direction thereof with respect to the table 40 in the longitudinal direction thereof parallel to the long-side direction of the top plate 41 of the table 40. Each of the side rails 51 is provided with a guide rail 51b that is provided on the upper surface of the base portion 51a to guide movement of the corresponding column 53 in the longitudinal direction. As described above, the long-side direction of the table 40 (top plate 41) and the longitudinal direction of the side rail 51 are the same direction, and these directions coincide with the front-rear direction in the automatic laminating apparatus. Hereinafter, these directions and directions parallel thereto will be referred to as "front-rear directions."

Each column 53 includes a pedestal portion 53a and a pair of support columns 53b and 53b standing on the pedestal portion 53a. Each column 53 is provided to be mounted on the base portion 51a of the corresponding side rail 51 in the pedestal portion 53a, and the pedestal portion 53a is provided to be movable in the front-rear direction of the side rail 51 in a form that is guided by the guide rail 51b of the side rail 51. The crossbeam 55 is a long rectangular column-shaped beam member, and is erected between the pair of columns 53 and 53 in a form in which opposite ends thereof are attached to the upper ends of the support columns 53b of the column 53. However, in such a state in which the crossbeam 55 is erected, both columns 53 and 53 are in a state in which the positions of the side rails 51 in the front-rear direction coincide with each other, and accordingly, the crossbeam 55 is in a state in which the longitudinal direction thereof coincides with a direction (short-side direction of the table 40 (top plate 41)) perpendicular to the front-rear direction of the side rail 51.

In the gantry portion having such a beam structure, a gantry drive mechanism (not shown) including, for example, a rack, a pinion gear, a driving motor, and the like is provided between each side rail 51 and the corresponding column 53. That is, the gantry portion is driven such that the pair of columns 53 and 53 and the crossbeam 55 erected between the columns 53 and 53 move along the front-rear direction of the side rails 51 by the gantry drive mechanism. As described above, the long-side direction of the crossbeam 55 and the short side direction of the table 40 (top plate 41) are the same direction, and these directions coincide with the width direction of the automatic laminating apparatus. Hereinafter, all of these directions and directions parallel thereto will be referred to as "width directions."

The saddle portion 57 is a mechanism for bringing the lay-up head 20 into a state of being supported by the support mechanism 50, and is provided on the crossbeam 55 in the above-configured gantry portion. The saddle portion 57 is mainly configured with a plate-shaped saddle base 57a provided on the crossbeam 55 to be movable in the width direction. The saddle portion 57 has a support shaft 57b supported rotatably about the saddle base 57a in a form of protruding downward from a surface of the saddle base 57a on the crossbeam 55 side. Therefore, a hole 55a that penetrates the crossbeam 55 in a vertical direction and extends in the width direction is formed in the crossbeam 55 in the gantry portion in order to allow arrangement of the support shaft 57b and movement of the saddle portion 57 in the width direction. The support shaft 57b of the saddle portion 57 is inserted through the hole 55a and extends below the crossbeam 55.

Further, the saddle portion 57 has a head driving mechanism provided on the saddle base 57a. The head driving mechanism is configured to rotate the support shaft 57b, and is configured with a driving motor 57c and a driving-force transmission mechanism 57d that connects the driving motor 57c to the support shaft 57b to transmit rotation of an output shaft of the driving motor 57c to the support shaft 57b. Therefore, the saddle portion 57 is configured such that the support shaft 57b is rotated by the head driving mechanism with a shaft center thereof extending in the vertical direction as the center of rotation.

In addition, a saddle driving mechanism for moving the saddle portion 57 along the width direction is provided between the saddle portion 57 and the crossbeam 55 in the support mechanism 50. The illustrated example is one example. The saddle driving mechanism includes: a driving motor 59a attached to the side surface of the saddle base 57a of the saddle portion 57 with the shaft center of the output shaft directed vertically; a rack 59b attached to the side surface of the crossbeam 55; and a pinion gear 59c attached to the output shaft of the driving motor 59a and engaging with the rack 59b. Therefore, the support mechanism 50 is configured to be driven by the saddle driving mechanism such that the saddle portion 57 moves on the crossbeam 55 in the width direction.

The lay-up head 20 on which the raw-cloth roller 21 of the thermoplastic prepreg is mounted is attached to the support shaft 57b of the saddle portion 57 of the above-configured support mechanism 50, and is thus provided in a state of being suspended by the crossbeam 55 of the support mechanism 50. In the support mechanism 50, both the columns 53 and 53 are driven to move on the side rails 51 and 51 in the front-rear direction and/or the saddle portion 57 is driven to move on the crossbeam 55 in the width direction, so that the lay-up head 20 moves above the table 40 in the front-rear direction, the width direction, or a direction intersecting the front-rear direction and the width direction.

The lay-up head 20 is mainly configured with a support frame including a pair of support plates 23 and 23, and supports the above-described raw-cloth roller 21 between the support plates 23 and 23. The raw-cloth roller 21 is formed by winding a long tape-shaped thermoplastic prepreg (hereinafter, referred to as a "prepreg tape PT") around a reel (winding frame). In the automatic laminating apparatus, the thermoplastic prepreg drawn out from the raw-cloth roller 21 of the lay-up head 20 is laminated (laid) on the table 40 (the top plate 41). Therefore, the lay-up head 20 is provided with each mechanism for realizing such lamination (laying) of the prepreg tape PT inside the support frame (between the support plates 23 and 23).

Figure 2:
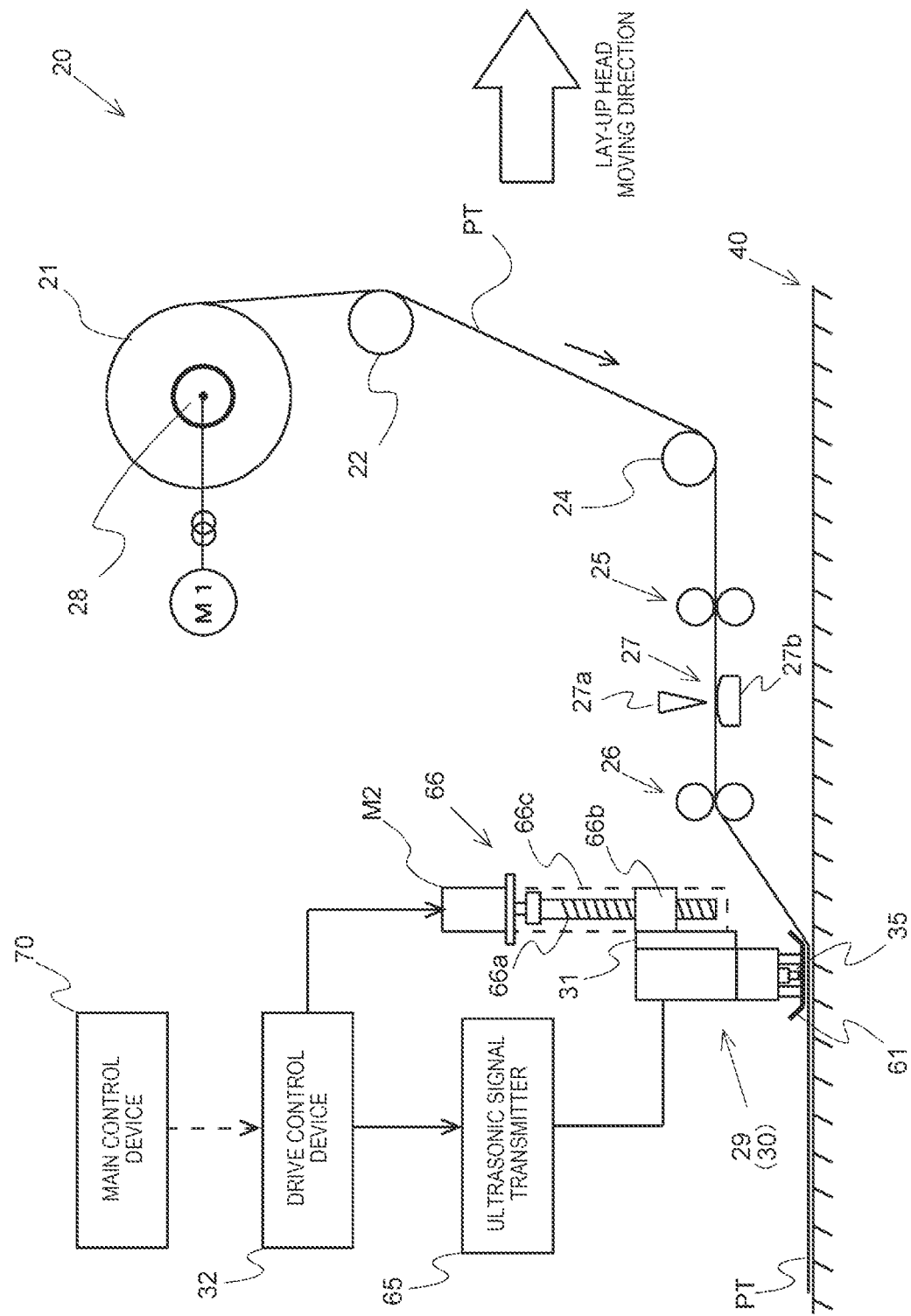
FIG. 2 is an explanatory diagram showing a lay-up head for the automatic laminating apparatus.

FIG. 2 is a diagram schematically showing a configuration inside the support frame in such a lay-up head 20. As shown in FIG. 2, in the lay-up head 20, the prepreg tape PT drawn out from the raw-cloth roller 21 is turned by being wound around a guide roll 24 via a tension roller 22, and is sent out toward a pressing device for performing the lamination (laying).

The raw-cloth roller 21 is rotatably supported by a let-out shaft 28 on one support plate 23 among the pair of support plates 23 and 23 of the support frame. Further, the let-out shaft 28 is connected to a let-out driving motor M1 via a driving-force transmission mechanism such as a gear train. As the let-out shaft 28 is rotationally driven by the let-out driving motor M1, the raw-cloth roller 21 is rotationally driven.

The prepreg tape PT drawn out from the raw-cloth roller 21 is wound around the tension roller 22 such that a path is bent at position closer to the raw-cloth roller 21 (upstream side) than to the guide roll 24, and accordingly, a form is provided in which the load by the prepreg tape PT is applied to the tension roller 22. Further, a load detector (not illustrated) such as a load cell is connected to the tension roller 22, and a load applied to the tension roller 22 by a tensile force of the prepreg tape PT is detected by the load detector. Accordingly, a tensile force of the prepreg tape PT is detected. In addition, as the drive of the let-out driving motor M1 that rotationally drives the raw-cloth roller 21 as described above is controlled based on a detected value of the detected tensile force of the prepreg tape PT, the tensile force of the prepreg tape PT is maintained at a desired level.

Further, in the lay-up head 20, the prepreg tape PT turned via the guide roll 24 is guided to the pressing device side via two sets of a pair of nip rolls 25 and 26 provided to be separated from each other on the path of the prepreg tape PT. Each of the nip rolls 25 and 26 positively sends out the prepreg tape PT to the pressing device side by rotationally driving one of the pair of rolls.

Further, a cutter device 27 for cutting the prepreg tape PT is provided between the two sets of nip rolls 25 and 26. The cutter device 27 includes a cutter 27a and a reception stand 27b provided to face the cutter 27a with the path of the prepreg tape PT interposed therebetween. At a time point when the prepreg tape PT having a predetermined length is drawn out, the cutter 27a is driven toward the reception stand 27b to cut the prepreg tape PT.

The prepreg tape PT that has passed through the tension roller 22, the guide roll 24, and the nip rolls 25 and 26 as described above is pressed against a lamination surface by the pressing device provided downstream of the nip roll 26 in the path of the prepreg tape PT. In addition, the columns 53 and 53 and/or the saddle portion 57 of the support mechanism 50 are driven as described above, and the lay-up head 20 moves on the table 40 (the lamination surface), so that the prepreg tape PT is sequentially laid in a movement direction thereof (lamination direction). One lamination operation is completed in which at a time point when the prepreg tape PT having a predetermined length is drawn out from the raw-cloth roller 21 as described above, the prepreg tape PT is cut by the cutter device 27, and a cut end reaches a destination, so that the prepreg tape PT having a predetermined length is laid (laminated) in a desired lamination direction.

In the automatic laminating apparatus described above, in the present invention, the lay-up head 20 is provided with a welding device for temporarily welding the thermoplastic prepreg to the lamination surface, and a drive control device for causing the welding device to perform the temporary welding operates the welding device to temporarily weld the thermoplastic prepreg laid in the lamination operation in a process of the lamination operation.

One embodiment (the present embodiment) of such an automatic laminating apparatus will be described below in detail. In the present embodiment described below, the above-described pressing device is included in a welding device 29 as a pressing mechanism 30. That is, the welding device 29 according to the present embodiment includes a pressing plate 61 functioning as a part of the pressing device (the pressing mechanism 30). In addition, the present embodiment is an example in which a welding head 29a of the welding device 29 and the pressing plate 61 of the pressing mechanism 30 are driven in a vertical direction by a common drive mechanism.

Figure 3:
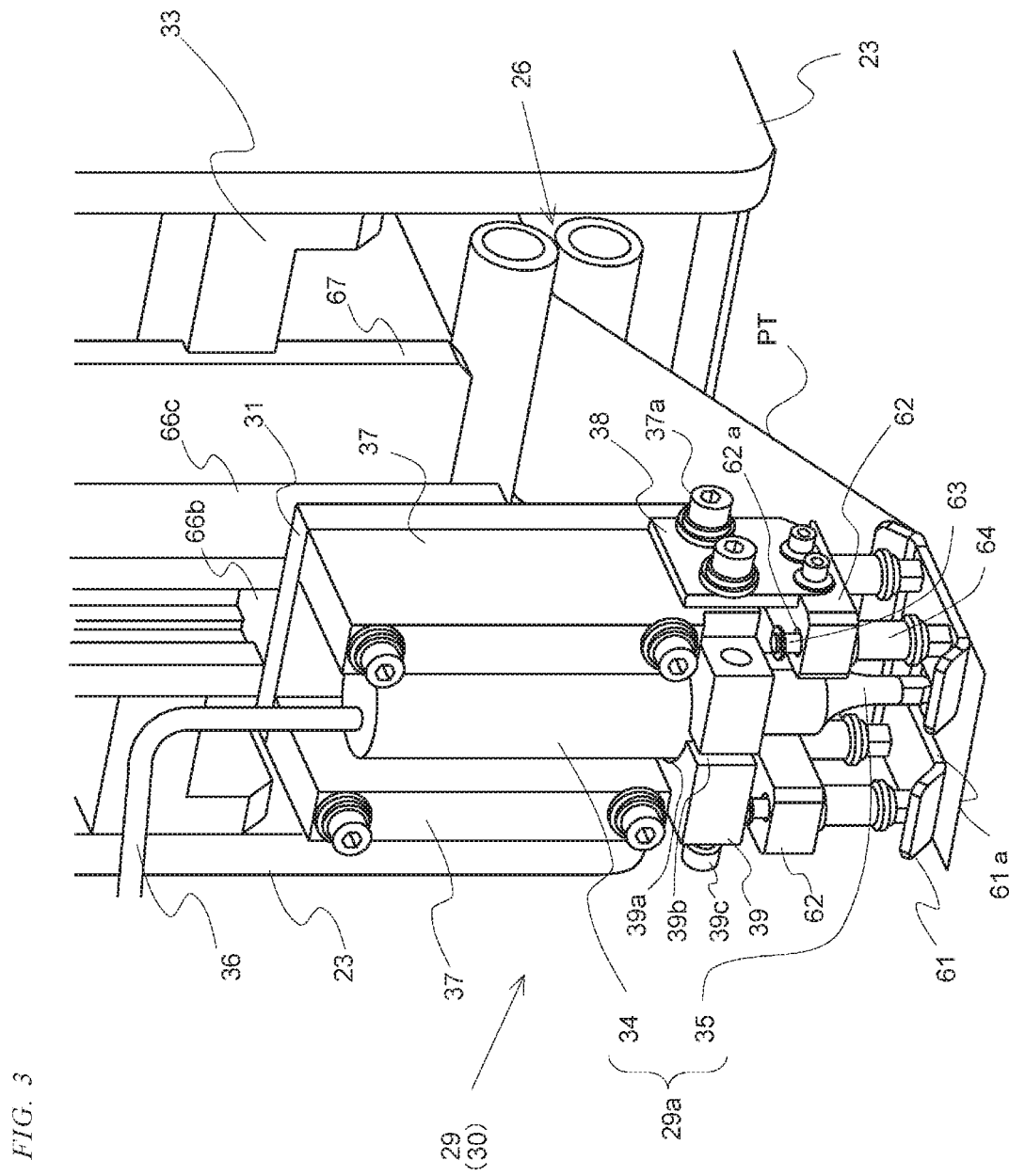
FIG. 3 is a perspective view showing an example of a welding device.

As illustrated in FIG. 3, a holder base 33 as a beam member is erected between the pair of support plates 23 and 23 in the support frame of the lay-up head 20. Further, an actuator bracket 67 for supporting the above-described drive mechanism is attached to the holder base 33. The actuator bracket 67 is a plate-shaped member which is formed in a substantially rectangular shape when viewed in the plate thickness direction, and is attached to the holder base 33 in a direction in which a long-side direction of both end surfaces coincides with the vertical direction and the both end surfaces are perpendicular to the support plates 23. Therefore, the actuator bracket 67 is provided in a form in which the front end surface thereof faces front.

In the present embodiment, a drive mechanism 66 is configured with a ball screw mechanism. In detail, as illustrated in FIG. 2, the drive mechanism 66 includes a driving motor M2 which is a servo motor as a drive source, a screw shaft 66a connected to an output shaft of the driving motor M2, a nut bracket 66b screwed to the screw shaft 66a, and a linear guide 66c that prevents the nut bracket 66b from rotating with respect to rotation of the screw shaft 66a and guides movement of the nut bracket 66b in the vertical direction.

Further, the linear guide 66c is a rectangular parallelepiped member in a form in which a recessed groove (concave groove) is formed along the longitudinal direction thereof. The linear guide 66c is supported by the actuator bracket 67 in a form in which the linear guide 66c is attached to the front end surface of the actuator bracket 67 in a direction in which an opening portion of the concave groove faces the front side and the longitudinal direction thereof coincides with the long-side direction of the actuator bracket 67. In such an attached state, the linear guide 66c is disposed such that in the left-right direction (direction perpendicular to the support plate 23) of the lay-up head 20, the center of the opening portion of the concave groove is located at a substantially central portion of the lay-up head 20.

Further, although not illustrated in detail, the driving motor M2 is supported by the actuator bracket 67 above the linear guide 66c in such arrangement in which an output shaft thereof is located at the center of the concave groove in a plan view. Therefore, the screw shaft 66a connected to the output shaft of the driving motor M2 is provided inside the concave groove of the linear guide 66c to extend along the longitudinal direction thereof.

In addition, the nut bracket 66b screwed to the screw shaft 66a is provided inside the concave groove of the linear guide 66c. The nut bracket 66b is a substantially prismatic member, and is formed in a size in which the nut bracket 66b loosely fits into the concave groove. Therefore, the nut bracket 66b is provided in a form in which the vertical movement thereof is slidably guided on the inner surface and the bottom surface of the concave groove of the linear guide 66c. However, the nut bracket 66b has a size in which a part thereof slightly protrudes from the opening portion of the concave groove in a state in which the nut bracket 66b loosely fits in the concave groove.

According to such a configuration of the drive mechanism 66, as the screw shaft 66a is driven by the driving motor M2, the nut bracket 66b screwed to the screw shaft 66a and prevented from rotating by the linear guide 66c moves upward or downward depending on a rotation direction of the screw shaft 66a. The movement of the nut bracket 66b is guided by the inner surface and the bottom surface of the concave groove of the linear guide 66c.

A support plate 31 as a support member that supports the welding device 29 is attached to a part of the nut bracket 66b, which protrudes from the opening portion of the concave groove of the linear guide 66c. Therefore, in the present embodiment, a drive device including a support member and a drive mechanism for driving the support member in the vertical direction is configured with the support plate 31 and the drive mechanism 66.

In detail, the support plate 31 is a plate-shaped member that is formed in a substantially rectangular shape when viewed in a plate thickness direction. The support plate 31 is oriented in a direction in which the long-side direction of both end surfaces in the plate thickness direction coincides with the vertical direction and the short-side direction thereof coincides with the left-right direction, and the nut bracket 66b is attached to one of the both end surfaces thereof. However, the attachment of the support plate 31 to the nut bracket 66b in the vertical direction is performed in a state in which the positions of the upper surfaces of the support plate 31 and the nut bracket 66b coincide with each other. Further, the support plate 31 has a dimension larger than the nut bracket 66b in the long-side direction (the vertical direction). Therefore, in the attached state, the support plate 31 is provided to extend downward of the nut bracket 66b.

Further, while being attached to the nut bracket 66b, the support plate 31 is provided in the left-right direction such that the center of the support plate 31 in the short-side direction is located substantially at the center of the lay-up head 20. That is, the support plate 31 is attached to the nut bracket 66b in a state in which the center of the support plate 31 coincides with the center of the nut bracket 66b (the opening portion of the concave groove in the linear guide 66c) in the left-right direction (the short side direction). The dimension of the support plate 31 in the short side direction is substantially the same as the dimension of the prepreg tape PT laid (laminated) on the lamination surface in the left-right direction.

Further, a pair of side holders 37 and 37 for attaching the welding head 29a and the pressing plate 61 to the support plate 31 are attached to the support plate 31 at both ends of the front end surface thereof in the short-side direction.

In detail, each of the side holders 37 is also a plate-shaped member like the support plate 31, which is formed in a substantially rectangular shape when viewed in the plate thickness direction. Further, each side holder 37 is formed such that the dimension of the both end surfaces thereof in the long-side direction substantially coincides with the dimension of the support plate 31 in the long-side direction. Each side holder 37 is attached to the support plate 31 with a screw member in a state in which the long-side direction of the side holder 37 coincides with the long-side direction of the support plate 31 and the side surface thereof abuts on the front end surface of the support plate 31. In a state in which each side holder 37 is attached as described above, the position of the end surface thereof facing the outside coincides with the position of the side edge of the support plate 31. Therefore, the both side holders 37 and 37 are opposite to each other, so that a space sandwiched between the both side holders 37 and 37 is formed in front of the front end surface of the support plate 31. In addition, the welding head 29a of the welding device 29 is disposed inside the space.

The welding device 29, which is an ultrasonic welding device in the present embodiment, includes a welding head 29a configured to include that applies vibration to the thermoplastic prepreg in order to temporarily weld the thermoplastic prepreg to the lamination surface. The welding head 29a is a configured to include vibration generation unit 34 having a cylindrical shape, which generates ultrasonic vibration therein, and a trumpet-shaped horn 35 that transmits the generated ultrasonic vibration to the temporarily welded thermoplastic prepreg. By the way, the vibration generation unit 34 is connected to an ultrasonic signal transmitter 65 that outputs an ultrasonic signal to the vibration generation unit 34 via a cable 36, and the vibration generation unit 34 is configured to generate an ultrasonic vibration according to the ultrasonic signal.

The welding head 29a is supported by horn holders 39 attached to the both side holders 37 and 37. The horn holder 39 is a block-shaped member having a substantially rectangular parallelepiped shape, which is formed in a size in which the horn holder 39 is fitted between the both side holders 37 and 37 in a direction in which the thickness direction coincides with the vertical direction. In a state in which the horn holders 39 are fitted between the both side holders 37 and 37 in the above-described direction and abut on the support plate 31, the horn holders 39 are attached to the both side holders 37 and 37 in arrangement in which the positions of the lower surfaces thereof in the vertical direction coincide with the positions of the lower surfaces of the side holders 37. The horn holders 39 have a size in which front portions thereof are located (protrudes) forward from the side holders 37 in such an attached state.

The welding head 29a is supported in a form in which the welding head 29a is fitted in the horn holder 39. Therefore, the horn holder 39 is formed with a through-hole 39a penetrated in the thickness direction (the vertical direction) thereof and having a size in which the vibration generation unit 34 of the welding head 29a can be inserted therethrough. Further, the horn holder 39 is formed with a slitting groove 39b that is open on a front end surface and upper and lower surfaces thereof and communicates with the through-hole 39a. In addition, the horn holder 39 has a configuration in which a split fastening bolt 39c is screwed to pass through the slitting groove 39b in the left-right direction, and is configured to form a so-called split fastening structure. In a state in which the vibration generation unit 34 is inserted through the through-hole 39a, the welding head 29a is supported by the horn holder 39 in a form of being fixed by a split fastening mechanism.

Further, a support block 62 for supporting the pressing plate 61 is attached to each side holder 37. Each support block 62 is attached to the corresponding side holder 37 by a side plate 38.

In detail, each side plate 38 is a thin plate-shaped member, and is attached to the outer end surface of the corresponding side holder 37 by two screw members 37a and 37a. The screw member 37a penetrates the side holder 37, is screwed into the horn holder 39, and is configured to attach the horn holder 39 to the side holder 37.

Further, in a state in which the side plate 38 is attached to the side holder 37 as described above, the side plate 38 has such a dimension in which a lower end thereof is located below the lower surface of the side holder 37 in the vertical direction. However, the dimension in the vertical direction is a dimension in which the support block 62 attached to the side plate 38 is located below the lower surface of the side holder 37 (separated downward from the side holder 37) as described later.

Each support block 62 is a block-shaped member having a substantially rectangular parallelepiped shape, and is attached to a lower end portion of the corresponding side plate 38. The attachment is performed by screwing, into the support block 62, the two screw members inserted through the side plate 38 from the outside of the side plate 38 in arrangement in which the support block 62 is located inside the side plate 38. Therefore, in such an attached state, the support block 62 is located below the side holder 37. Further, since the side plate 38 has the above-described dimension in the vertical direction, the support block 62 is positioned such that the upper surface thereof is separated from the lower surface of the side holder 37 in the attached state.

The support block 62 has a size in which the dimension in the left-right direction substantially coincides with that of the side holder 37 in the above-described attached state, and is provided such that there is an interval, which is substantially the same as that between the pair of side holders 37 and 37, provided between the both support blocks 62 and 62. Further, each support block 62 is formed with two through-holes 62a and 62a vertically penetrating the support block 62 in the attached state and arranged in a direction parallel to the end surface of the side holder 37.

A shaft 63, which is a rod-shaped member, is inserted through each through-hole 62a, and the pressing plate 61 is attached to a lower end of the shaft 63. Therefore, the pressing plate 61 is provided such that the shaft 63 is guided in the vertical direction by being guided in the corresponding through-hole 62a.

Figure 4A:
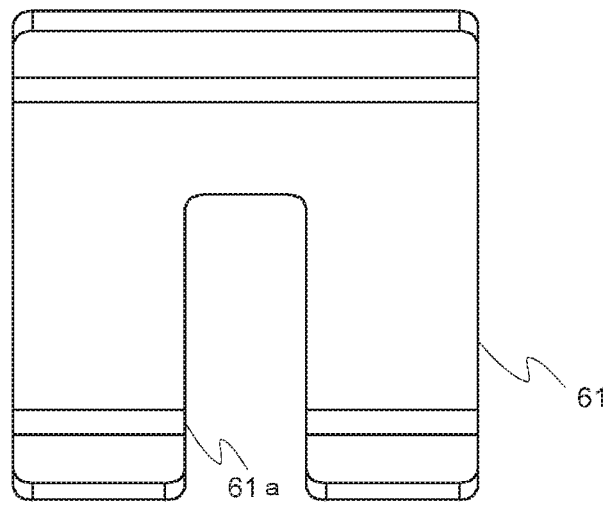
FIGS. 4A and 4B are plan views showing an example of a pressing plate.

In detail, the pressing plate 61, which is a member for pressing the prepreg tape PT against the lamination surface, is formed in a thin plate-shaped member in the present embodiment. As illustrated in FIG. 4A, the pressing plate 61 is a generally rectangular member when viewed in the plate thickness direction. However, the pressing plate 61 is formed with a notch 61a which is opened in one of the short sides of a plate surface forming the rectangular shape and penetrates the one of the short sides in the plate thickness direction, and accordingly, the pressing plate 61 is formed to have a U shape as a whole. Further, the dimension of the pressing plate 61 in a direction of the short side (short-side direction) is substantially the same as the dimension of the support plate 31 (the prepreg tape PT) in the left-right direction. Further, the pressing plate 61 has a shape in which both end portions of the plate surface in a direction of the long side (the long-side direction) are bent to one side in the plate thickness direction. The plate surface on a side where the both end portions thereof are bent is an upper surface of the pressing plate 61.

The pressing plate 61 is attached to the shaft 63 in a form in which the upper surface thereof abuts on a tip end of the shaft 63 in arrangement in which, in a plan view, the long-side direction thereof coincides with a direction parallel to the end surface of the side holder 37 and the position of the center thereof in the short-side direction coincides with the position of the center of the support plate 31 in the short-side direction. Therefore, the two shafts 63 and 63 inserted through the through-holes 62a and 62a of each support block 62 stand on the upper surface of the pressing plate 61 on one side and the other side of the notch 61a in the short-side direction. However, in a state in which the shaft 63 is inserted through the through-hole 62a of the support block 62, the shaft 63 and the pressing plate 61 are provided in a form in which the short side of the pressing plate 61 where the notch 61a is open faces the front side.

Further, a spring member (compression spring) 64 provided to correspond to the shaft 63 and provided in a form in which the corresponding shaft 63 is inserted therethrough is interposed between the pressing plate 61 and each support block 62. Accordingly, a downward biasing force is always applied to the pressing plate 61 and the shaft 63 by the spring member 64. However, a ring-shaped retaining member for preventing the shaft 63 from being separated from the through-hole 62a of the support block 62 is attached to an upper end of the shaft 63. Therefore, in a state in which the pressing plate 61 does not press the prepreg tape PT, the biasing force of the spring member 64 is received by the retaining member.

In addition, in a state in which the vibration generation unit 34 is supported by the horn holder 39 as described above, the welding head 29a is disposed such that a tip end of the horn 35 is located inside the notch 61a of the pressing plate 61, in the front-rear direction and the left-right direction of the lay-up head 20. Further, in a state in which the pressing plate 61 does not press the prepreg tape PT, the welding head 29a is disposed such that the tip end of the horn 35 is located slightly above the pressing plate 61, in the vertical direction.

As described above, the pressing plate 61 and the welding head 29a are supported by the pair of side holders 37 and 37 attached to the support plate 31, and the support plate 31 is attached to the nut bracket 66b driven to move in the vertical direction in the drive mechanism 66. Accordingly, the pressing plate 61 and the welding head 29a are driven to move upward or downward as the nut bracket 66b in the drive mechanism 66 is driven to move upward or downward as described above. The driving is performed such that the pressing plate 61 and the welding head 29a move between a position (hereinafter, referred to as a "standby position") where the pressing plate 61 is separated from the prepreg tape PT and a position (hereinafter, referred to as a "lamination position") where the tip end of the horn 35 is pressed against the prepreg tape PT.

In a state in which the pressing plate 61 does not press the prepreg tape PT, since the tip end of the horn 35 is located slightly above the pressing plate 61 as described above, with the movement of the pressing plate 61 and the welding head 29a toward the lamination position, the pressing plate 61 comes into contact with the prepreg tape PT before the tip end (the welding head 29a) of the horn 35 comes into contact with the prepreg tape PT. Further, since the pressing plate 61 (the shaft 63) can be displaced upward with respect to the support block 62 and the position of the pressing plate 61 is held by the spring member 64, the movement toward the lamination position from a time point of the contact is permitted as the spring member 64 is compressed and the shaft 63 is displaced upward with respect to the support block 62. In a state in which the welding head 29a reaches the lamination position, the tip end of the horn 35 is pressed against the prepreg tape PT. Further, in this state, the spring member 64 is compressed as described above, so that the pressing plate 61 presses the prepreg tape PT against the lamination surface with a force corresponding to the biasing force of the spring member 64.

Further, the automatic laminating apparatus includes a drive control device 32 that controls the drive of the drive mechanism 66 (the driving motor M2) such that the drive mechanism 66 is operated as described above. Further, the drive control device 32 is also configured to control the welding device 29 to temporarily weld the prepreg tape PT to the lamination surface.

As illustrated in FIG. 2, the drive control device 32 is connected to, on an input side thereof, a main control device 70 that controls the movement of the lay-up head 20. Further, the drive control device 32 is connected to, on an output side thereof, the driving motor M2 and the ultrasonic signal transmitter 65 in the welding device 29. Although detailed description is omitted, the main control device 70 controls driving of each driving motor (the driving motor 59a and the like) in the support mechanism 50 to move the lay-up head 20 such that a predetermined prepreg tape PT is laid (laminated). Further, the control is performed according to a predetermined operation program.

The drive control device 32 drives the driving motor M2 of the drive mechanism 66 to move the pressing plate 61 and the welding head 29a to the lamination position at a time point of starting one lamination operation by the lay-up head 20 as described above. In addition, when the lay-up head 20 starts moving, the drive control device 32 generates an ultrasonic vibration from the tip end of the horn 35 via the ultrasonic signal transmitter 65 and the vibration generation unit 34 of the welding head 29a. Accordingly, the ultrasonic vibration is transmitted to the prepreg tape PT at a portion where the horn 35 is pressed, and the prepreg tape PT is temporarily welded to the lamination surface.

In the automatic laminating apparatus according to the present embodiment as described above, the welding device 29 is provided in a form of being mounted on the lay-up head 20, and the pressing plate 61 that presses the prepreg tape PT when the prepreg tape PT is laid (laminated) and the welding head 29a of the welding device 29 are driven by a common drive mechanism 66. In addition, the drive control device 32 is configured to control the operation of the welding device 29 such that the prepreg tape PT is temporarily welded while the lay-up head 20 is moving.

Accordingly, according to the automatic laminating apparatus, in each lamination operation by the lay-up head 20, the prepreg tape PT is temporarily welded by the welding head 29a while the prepreg tape PT is laid on the lamination surface. That is, in a course of one lamination operation, the lamination operation is progressed while the pressing of the prepreg tape PT against the lamination surface for laying and the temporary welding are performed substantially simultaneously. Accordingly, since there is no positional deviation from a position where the laid prepreg tape PT is to be laminated, it is possible to prevent quality deterioration of a fiber-reinforced composite material manufactured from the laminated body of the prepreg tape PT.

Further, according to the automatic laminating apparatus, as described above, a configuration is adopted in which the welding head 29a provided on the lay-up head 20 and the pressing plate 61 are driven by the common drive mechanism 66. In other words, in the automatic laminating apparatus, a configuration is employed in which the drive mechanism for driving the pressing plate 61 also drives the welding head 29a. Accordingly, even while the lay-up head 20 is equipped with a welding device, an increase in the size of the apparatus can be avoided, and manufacturing costs can be reduced.

The present invention is not limited to the above-described embodiment (the embodiment), and can be implemented in the following modified embodiments.

(1) In the pressing device, in the pressing mechanism 30 as a pressing device according to the embodiment, the pressing plate 61 that is a plate-shaped (thin plate-shaped) single member is employed as a configuration (pressing means) of pressing the prepreg tape PT against the lamination surface, and the pressing plate 61 is formed to press the prepreg tape PT on both sides of the welding head 29a (the horn 35). However, the pressing device according to the present invention is not limited to the pressing device configured as described above.

Figure 4B:
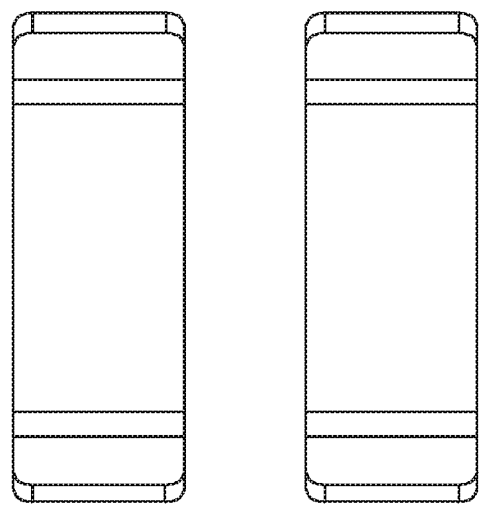

For example, even in a case where the pressing device is configured to press the prepreg tape PT on both sides of the welding head 29a as in the embodiment, the pressing means may be configured such that a member (pressing member) for pressing the prepreg tape PT is two plate-shaped members as illustrated in FIG. 4B. In this case, the pressing members are attached to the shaft 63 in the embodiment, and are disposed on both sides of the welding head 29a.

Further, the pressing means in the pressing device is not limited to a configuration in which the pressing members are provided on both sides of the welding head 29a as described above, but may have a configuration in which the pressing members are provided on the rear side of the welding head 29a (supply side of the prepreg tape PT). In this case, the pressing means can be configured with a single pressing member. Further, in both case where the pressing members of the pressing means are provided on both sides of the welding head 29a and where the pressing members are provided on the rear side of the welding head 29a, the pressing members are not limited to those formed in a plate shape, and may have a block shape (substantially rectangular parallelepiped shape) or a roller shape.

(2) In the above embodiment, the drive mechanism of the pressing mechanism 30 as the pressing device and the drive mechanism of the welding device 29 are common, and the automatic laminating apparatus is configured such that the welding device 29 includes the pressing device. However, the automatic laminating apparatus according to the present invention is not limited to such a configuration, and may have a configuration in which the pressing device and the welding device are independently provided, that is, a configuration in which the pressing device and the welding device are each driven by a dedicated drive mechanism.

The automatic laminating apparatus according to the embodiment is configured such that the welding device 29 provided in the lay-up head 20 includes the above-described pressing device (the pressing mechanism 30), and is configured such that the welding device 29 and the pressing device are attached (added) to the lay-up head 20. However, since some existing automatic laminating apparatuses already include the pressing device, when the present invention is applied to such an automatic laminating apparatus, only the welding device is added to the lay-up head. Since the pressing device already has a drive mechanism, even in this case, the automatic laminating apparatus has a configuration in which the pressing device and the welding device are each driven by the dedicated drive mechanism.

Further, the drive mechanism for driving the welding device is not limited to a ball screw mechanism as in the embodiment, including a case where the drive mechanism is used by the pressing device in common as in the embodiment, and may be another mechanism (for example, a rack and pinion mechanism).

(3) In the welding device, in the embodiment, an ultrasonic welding machine is used as the welding device. However, in the automatic laminating apparatus according to the present invention, the welding device is not limited to the ultrasonic welding device, and may be another welding device (for example, an infrared welding device, a thermal welding device, or the like).

As described in the embodiment, the drive control device 32 controls an operation of the welding device 29 such that the prepreg tape PT is temporarily welded during movement of the lay-up head 20 in a course of one lamination operation. However, in the control by the drive control device in the present invention, the temporary welding may be performed continuously or may be performed intermittently in a course of one lamination operation.

Further, in a case where the temporary welding is performed intermittently in the course of one lamination operation as described above, the drive control device may control the welding device itself such that the welding device is switched between an operation state in which the temporary welding is performed and a non-operation state in which the temporary welding is not performed or the drive control device may control driving of the drive mechanism that drives the welding device such that the welding head is separated from the prepreg tape PT at a portion where the temporary welding is not performed.

However, when the welding device is a heat welding device, a state in which the welding head emits heat continues even in the non-operation state. Therefore, in order to partially prevent the temporary welding, the control of the welding device itself cannot cope with this situation, and it is required to cope with this situation by the control of the drive mechanism as in the latter case. Further, when the welding head is separated from the prepreg tape PT as in the latter case, the intermittent temporary welding is performed during the lamination operation, and the pressing device needs to keep pressing the prepreg tape PT. Thus, in this case, as described above in the example (2), it is necessary that each of the pressing device and the welding device be driven by the dedicated drive mechanism.

The present invention is not limited to the above-described examples, and can be appropriately changed without departing from the spirit of the present invention.

What is claimed is:

1. An automatic laminating apparatus comprising:
a lay-up head provided with a raw-cloth roller on which a thermoplastic prepreg is wound and a pressing device for pressing the thermoplastic prepreg drawn from the raw-cloth roller against a lamination surface; and
a welding device provided with a welding head pressed against the thermoplastic prepreg to temporarily weld the thermoplastic prepreg to the lamination surface,
the automatic laminating apparatus laminating the thermoplastic prepreg by performing a lamination operation of moving the lay-up head to lay the thermoplastic prepreg having a predetermined length on the lamination surface, wherein the welding device includes a pressing mechanism as the pressing device, the pressing mechanism includes a pressing plate that presses the thermoplastic prepreg to the lamination surface on both sides of the welding head, or only on a rear side of the welding head, in the width direction of the laid thermoplastic prepreg, the lay-up head includes the welding device and a support member in which the pressing plate and the welding head are attached, the support member supporting the pressing plate and the welding head to be vertically movable, and the automatic laminating apparatus further comprises a drive device that includes a drive mechanism that drives the support member in a vertical direction, and a drive control device that causes the welding device to perform temporary welding of the thermoplastic prepreg laid in the lamination operation in a course of the lamination operation.

\* \* \* \* \*